US012561016B2

(12) United States Patent
Grochowski

(10) Patent No.: US 12,561,016 B2
(45) Date of Patent: Feb. 24, 2026

(54) ACCESSORY FOR A COMPUTER MOUSE

(71) Applicant: Lindsey C. Grochowski, Tonawanda, NY (US)

(72) Inventor: Lindsey C. Grochowski, Tonawanda, NY (US)

( * ) Notice: Subject to any disclaimer, the term of this patent is extended or adjusted under 35 U.S.C. 154(b) by 0 days.

(21) Appl. No.: 18/654,680

(22) Filed: May 3, 2024

(65) Prior Publication Data

US 2024/0370107 A1 Nov. 7, 2024

Related U.S. Application Data

(60) Provisional application No. 63/499,747, filed on May 3, 2023.

(51) Int. Cl.
G06F 3/039 (2013.01)
(52) U.S. Cl.
CPC .................................... G06F 3/039 (2013.01)
(58) Field of Classification Search
CPC ............. G06F 3/039; G06F 2203/0333; G06F 3/03543
See application file for complete search history.

(56) References Cited

U.S. PATENT DOCUMENTS

| 4,913,573 | A | * | 4/1990 | Retter | .................. | H01H 13/807 |
| | | | | | | 400/489 |
| D373,999 | S | * | 9/1996 | Staats | .......................... | D14/409 |

| 5,576,733 | A | * | 11/1996 | Lo | ........................ | G06F 3/03543 |
| | | | | | | D14/405 |
| 5,894,302 | A | * | 4/1999 | Scenna | ............... | G06F 3/03543 |
| | | | | | | 345/163 |
| 5,945,646 | A | * | 8/1999 | Miller | .................... | B60K 35/80 |
| | | | | | | 200/600 |
| 5,949,406 | A | * | 9/1999 | Kress | ...................... | G06F 3/039 |
| | | | | | | 248/118.1 |
| 5,990,870 | A | * | 11/1999 | Chen | ................... | G06F 3/03543 |
| | | | | | | 345/161 |

(Continued)

FOREIGN PATENT DOCUMENTS

| CN | 2446581 Y | 9/2001 |
| CN | 201477534 U | 5/2010 |

(Continued)

*Primary Examiner* — Benyam Ketema
(74) *Attorney, Agent, or Firm* — Simpson & Simpson, PLLC

(57) ABSTRACT

An accessory for a computer mouse, the computer mouse having a body, a first button having a first contour, and a second button having a second contour, the accessory including a first attachment means having a proximal surface and a distal surface, the distal surface fixedly secured to the first button of the computer mouse, the distal surface configured to have the first contour, a first trough fixedly secured to the proximal surface of the first attachment means, the first trough having a first patient-specific finger rest configuration, a second attachment means having a proximal surface and a distal surface, the distal surface fixedly secured to the second button of the computer mouse, the distal surface configured to have the second contour, and a second trough fixedly secured to the proximal surface of the second attachment means, the second trough having a second patient-specific finger rest configuration.

18 Claims, 12 Drawing Sheets

(56) References Cited

U.S. PATENT DOCUMENTS

| | | | |
|---|---|---|---|
| 6,256,015 B1 * | 7/2001 | Adler | G06F 3/039 |
| | | | D14/402 |
| 6,362,811 B1 * | 3/2002 | Edwards | G06F 3/03543 |
| | | | 248/118.1 |
| 6,377,245 B1 | 4/2002 | Park | |
| 6,765,502 B2 * | 7/2004 | Boldy | G06F 3/021 |
| | | | 400/489 |
| D509,828 S | 9/2005 | Wang | |
| 7,098,893 B2 | 8/2006 | Rogers | |
| 7,277,083 B2 * | 10/2007 | Duncan | A63F 13/245 |
| | | | 715/702 |
| 7,609,251 B2 | 10/2009 | Rogers | |
| 7,675,505 B1 | 3/2010 | Gehrking | |
| 7,755,609 B2 * | 7/2010 | Segalle | G06F 3/03543 |
| | | | 345/163 |
| 9,063,587 B2 * | 6/2015 | Boldin | G06F 3/03543 |
| 11,543,893 B2 * | 1/2023 | Pate | G06F 3/0221 |
| 2001/0021332 A1 * | 9/2001 | Boldy | G06F 3/021 |
| | | | 400/489 |
| 2005/0030285 A1 * | 2/2005 | Fu | G06F 3/03543 |
| | | | 345/157 |
| 2005/0083297 A1 * | 4/2005 | Duncan | A63F 13/22 |
| | | | 345/156 |
| 2006/0007152 A1 | 1/2006 | Wang | |
| 2006/0033714 A1 * | 2/2006 | Boldin | G06F 3/03543 |
| | | | 345/163 |
| 2006/0274044 A1 * | 12/2006 | Gikandi | G06F 3/03543 |
| | | | 345/163 |

| | | | |
|---|---|---|---|
| 2007/0242046 A1 * | 10/2007 | Weiss | G06F 3/03543 |
| | | | 345/163 |
| 2008/0101840 A1 * | 5/2008 | Chaumont | G06F 3/0202 |
| | | | 400/490 |
| 2008/0165123 A1 * | 7/2008 | Segalle | G06F 3/03543 |
| | | | 345/156 |
| 2008/0259026 A1 * | 10/2008 | Zeldin | G06F 3/0317 |
| | | | 345/157 |
| 2009/0289896 A1 | 11/2009 | Jacob | |
| 2013/0063551 A1 | 3/2013 | Sarwari et al. | |
| 2015/0261324 A1 * | 9/2015 | Huang | G06F 3/03543 |
| | | | 345/163 |
| 2015/0268741 A1 * | 9/2015 | Evje | G06F 3/03543 |
| | | | 345/163 |
| 2015/0363010 A1 * | 12/2015 | Wang | G06F 3/03543 |
| | | | 345/163 |
| 2017/0045959 A1 * | 2/2017 | Chen | G06F 3/03543 |
| 2017/0075438 A1 * | 3/2017 | Chen | G06F 3/03543 |
| 2017/0192536 A1 * | 7/2017 | Wang | G06F 3/03543 |
| 2018/0205086 A1 * | 7/2018 | Ushijima | H01M 4/13 |
| 2019/0163290 A1 * | 5/2019 | Lu | G06F 3/0202 |
| 2023/0045204 A1 * | 2/2023 | Henzler | A61F 7/007 |

FOREIGN PATENT DOCUMENTS

| | | |
|---|---|---|
| CN | 201638174 U | 11/2010 |
| CN | 111459304 A | 7/2020 |
| CN | 111459305 A | 7/2020 |
| JP | 2002358159 A | 12/2002 |
| KR | 20030076465 A | 9/2003 |

* cited by examiner

ACCESSORY FOR A COMPUTER MOUSE

CROSS-REFERENCE TO RELATED APPLICATIONS

This application claims priority pursuant to 35 U.S.C. 119 (e) to U.S. Provisional Application No. 63/499,747, filed May 3, 2023, which application is incorporated herein by reference in its entirety.

FIELD

The present invention relates to an adaptation, or accessory, for a standard computer mouse allowing individuals with various hand-related disabilities, specifically, finger deformities, to use and/or more comfortably use, a computer mouse.

BACKGROUND

Development of hand problems, such as hand-related disabilities and/or deformities usually presents itself in the older population. Generally, when individuals experience these hand problems, there are different modes of thought associated therewith. One is the "wear and tear" theory, where cells "wear out" from repeated use, thereby "killing" themselves (i.e., apoptosis) and then "killing" the body. The main theme of this theory is that functional loss is inevitable and invariant. Another theory is the "health and wellbeing" approach, which typically does not investigate the specific illness or degeneration that is causing the problem but rather focuses on compensation for the issue and function. The latter approach is more closely associated with occupational therapy and its treatments-individuals must retain their ability to engage in meaningful "occupations" (i.e., hobbies, jobs, lifestyles) or risk further detriment to their own subjective valve placed on their quality of life.

The aforementioned hand problems can include disabilities such as rheumatoid arthritis, osteoarthritis, fibromyalgia, gout, systemic lupus erythematosus, general finger dexterity impairments, and general peripheral sensation loss. The management of rheumatic diseases focuses primarily on medical management, accessory, adaptive techniques and tools, and psychosocial interventions, but in some circumstances, surgical intervention may be required for cases where erosive properties of the problems are not curbed.

By 2030, Americans 65 and older are projected to make up roughly 20% of the U.S. population of about 65.9 million people. Rheumatoid arthritis is typically diagnosed between 40 to 70 years of age and is reported to affect approximately 1% of the world's population—approximately 80 million people. Rheumatoid arthritis can also present as juvenile rheumatoid arthritis, i.e., diagnosed before age 16. As such, rheumatoid arthritis, and the associated issues, are a growing problem.

The human hand generally includes five (5) metacarpals. Extending from each metacarpal is the proximal phalanx, the middle phalanx, and the distal phalanx (i.e., the tip of the finger). The aforementioned bones of the hand are each connected by a joint, positioned between each bone (e.g., the joint is positioned between the proximal phalanx and the middle phalanx). Articular cartilage is located at each of the respective ends of the specific bone. A joint cavity is positioned within the joint and between the respective articular cartilage of the respective bone ends, which cavity is filled with synovial fluid contained within a sheath called the synovium. The metacarpophalangeal joint ("MCP") is arranged between an end of the metacarpal and a first end of the proximal phalanx, the proximal interphalangeal joint ("PIP") is arranged between a second end of the proximal phalanx and a first end of the middle phalanx, the distal interphalangeal joint ("DIP") is arranged between a second end of the middle phalanx and an end of the distal phalanx.

The aforementioned diseases (i.e., autoimmune diseases), specifically, rheumatoid arthritis, of the hand can cause reactions in the body which result in the formation of synovitis (inflammation in the synovial membrane) and tenosynovitis (inflammation of the synovium). These forms of inflammation can lead to joint damage and ligament laxity in the hand and/or fingers, thereby causing a muscle imbalance. This is a chronic inflammatory disease which can ultimately lead to degradation of cartilage and bones (shown and discussed greater, infra), which ultimately can deform the fingers of the hand.

When a patient has the aforementioned deformations of their fingers, using a traditional computer mouse is almost impossible, as the deformations relocate the fingers in positions that make using respective right and left computer mouse buttons extremely difficult, and in some cases, impossible.

Thus, there is a long felt need for an apparatus that is adapted for an individual having finger deformations of their hand allowing them to be able to use a left and a right button on a standard computer mouse.

There is also an additional need for an apparatus that is adapted for an individual having finger deformations of their hand allowing them to be able to use a left and a right button on a standard computer mouse that is configured to either fixedly or removably attach to the standard computer mouse.

SUMMARY

According to aspects illustrated herein, the present invention provides for an accessory for a computer mouse, the computer mouse having a body, a first button having a first contour, and a second button having a second contour, the accessory including a first attachment means having a proximal surface and a distal surface, the distal surface fixedly secured to the first button of the computer mouse, the distal surface configured to have the first contour, a first trough fixedly secured to the proximal surface of the first attachment means, the first trough having a first patient-specific finger rest configuration, a second attachment means having a proximal surface and a distal surface, the distal surface fixedly secured to the second button of the computer mouse, the distal surface configured to have the second contour, and a second trough fixedly secured to the proximal surface of the second attachment means, the second trough having a second patient-specific finger rest configuration.

In some embodiments, the present invention generally comprises a detachable accessory for a computer mouse, the computer mouse having a body, a first button having a first contour, and a second button having a second contour, the accessory, comprising a first attachment means having a proximal surface and a distal surface, the distal surface configured to have the first contour, a first trough fixedly secured to the proximal surface of the first attachment means, the first trough having a first patient-specific finger rest configuration, a first clamp means extending from the first attachment means arranged to removably and frictionally secure to the body of the mouse, a second attachment means having a proximal surface and a distal surface, the distal surface configured to have the second contour, a second trough fixedly secured to the proximal surface of the second attachment means, the second trough having a second patient-specific finger rest configuration, a second clamp means extending from the second attachment means arranged to removably and frictionally secure to the body of the mouse, and at least one connecting member fixedly secured to both the first attachment means and the second attachment means.

In some arrangements, the present invention may comprise an accessory for a computer mouse, the computer mouse having a body, a first button and a second button, the accessory, comprising a first mounting piece having a distal surface and a proximal surface, the distal surface arranged to be fixedly secured to the first button, a second mounting piece having a distal surface and a proximal surface, the distal of the second mounting piece arranged to be fixedly secured to the second button, a first trough having a distal surface and a proximal surface, the distal surface of the first trough arranged to be fixedly secured to the proximal surface of the first mounting piece, the first trough having a first patient-specific finger rest configuration, and a second trough having a distal surface and a proximal surface, the distal surface of the second trough arranged to be fixedly secured to the proximal surface of the second mounting piece, the second trough having a second patient-specific finger rest configuration.

In further arrangements, the present invention may comprise an accessory for computer mouse, the computer mouse having a body, a first button, and a second button, the accessory comprising a first mounting piece and second mounting piece each of which having a proximal surface and a distal surface, the first and second mounting pieces connected by at least one connecting member, a first gripping device extending from the first mounting piece and a second gripping device extending from the second mounting piece, a first trough having a distal surface and a proximal surface, the distal surface of the first trough arranged to be fixedly secured to the proximal surface of the first mounting piece, the first trough having a first patient-specific finger rest configuration, and a second trough having a distal surface and a proximal surface, the distal surface of the second trough arranged to be fixedly secured to the proximal surface of the second mounting piece, the second trough having a second patient-specific finger rest configuration, wherein the first gripping device is springingly attached to the first mounting piece and the second gripping device is springingly attached to the second mounting piece, whereas the first and the second gripping devices are arranged to frictionally secure and releasably hold the body of the mouse.

In other embodiments, the present invention may also comprise a process for making at least one of the first patient-specific finger rest configuration of the first trough or the second patient-specific finger rest configuration of the second trough of the aforementioned accessory, the process comprising the steps of: cutting a first piece of thermoplastic; heating the first piece of thermoplastic; molding the heated first piece of thermoplastic on either a first finger or a second finger of a patient; letting the first piece of thermoplastic cool; and, trimming excess material from the first piece of thermoplastic.

The aforementioned process may further comprise the step of rolling edges of the first piece of thermoplastic.

The aforementioned process may still further comprise the step of checking the fit of the first piece of thermoplastic with either the first or the second finger.

In even further arrangements, the present invention may comprise an accessory for a computer mouse, the computer mouse having a body, a first button and a second button, the accessory comprising a first finger member having a first finger support section and a first finger trough section secured atop the first finger support section, the first finger trough section having a shape which is customized to fit a user's first finger, and a second finger member having a second finger support section and a second finger trough section secured atop the second finger support section, the second finger trough section having a shape which is customized to fit a user's second finger, wherein the first finger support section is operatively arranged to be secured to the first button, and wherein the second finger support section is operatively arranged to be secured to the second button.

In one possible aspect, the present invention may comprise an accessory for a computer mouse, the computer mouse having a body, a first button, and a second button, the accessory, comprising, a first mounting piece and second mounting piece each of which having a proximal surface and a distal surface, a first trough having a distal surface and a proximal surface, the distal surface of the first trough arranged to be fixedly secured to the proximal surface of the first mounting piece, the first trough having a first patient-specific finger rest configuration; and a second trough having a distal surface and a proximal surface, the distal surface of the second trough arranged to be fixedly secured to the proximal surface of the second mounting piece, the second trough having a second patient-specific finger rest configuration, wherein the first and second mounting pieces are: fixedly secured to the first and second buttons; or, removable secured to one or more of the body of the computer mouse, the first button, or the second button.

In some configurations of the aforementioned accessory, when the first and second mounting pieces are fixedly secured to the first and second buttons of the computer mouse, the first button has a first contour and the second button has a second contour, where the distal surface of the first mounting piece has a third contour and the distal surface of the second mounting piece has a fourth contour, where the first contour and the third contour are substantially identical and the second contour and the fourth contour are substantially identical.

In other possible arrangements, when the first and second mounting pieces of the aforementioned accessory are fixedly secured to the first and second buttons of the computer mouse, the accessory may further comprise a first rotary adjustment mechanism arranged between the first mounting piece and the first trough, thereby allowing the first trough to rotate, and a second rotary adjustment mechanism between the second mounting piece and second trough, thereby allowing the second trough to rotate.

In one possible embodiment, when said first and second mounting pieces of the aforementioned accessory are removably secured to one or more of the body of the computer mouse, the first button, or the second button, the accessory further comprises an attachment body arranged to frictionally secure to the body of the mouse, the attachment body including the first and second mounting pieces, wherein the first and second mounting pieces are connected by at least one connecting element.

In some embodiments, the aforementioned attachment body further comprises a first gripping arm attached to the first mounting piece, and a second gripping arm attached to the second mounting piece, wherein the first and second gripping arms frictionally secure to the body of the mouse.

In other arrangements, the aforementioned attachment body further comprises a first rotary adjustment mechanism arranged between the first mounting piece and the first trough, thereby allowing the first trough to rotate, and a second rotary adjustment mechanism arranged between the second mounting piece, thereby allowing the second trough to rotate.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
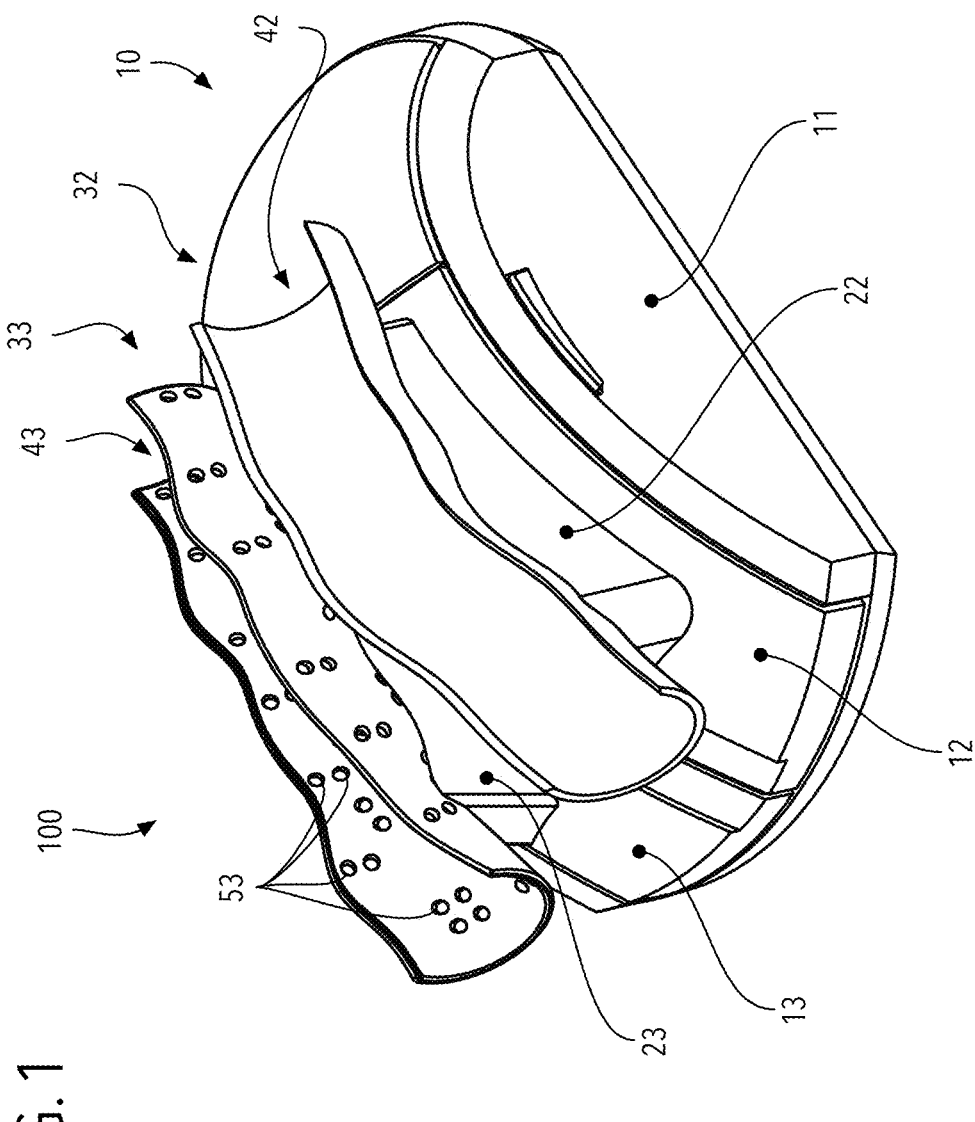
FIG. 1 illustrates a side-perspective view of a first embodiment of the present invention.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims. As such, those in the art will understand that in any suitable material, now known or hereafter developed, may be used in forming the present invention described herein.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" or "one of:" is used herein.

The following description is in reference to U.S. Provisional Application No. 63/499,747, filed May 3, 2023 (hereinafter "the '747 application", specifically, FIGS. 1 through 7 thereof, which figures generally illustrate and describe the basic anatomy of a human hand, a human hand presenting with rheumatoid arthritis (hereinafter "RA"), the progression of RA, and an RA hand compared to a traditional computer mouse.

Figure 2:
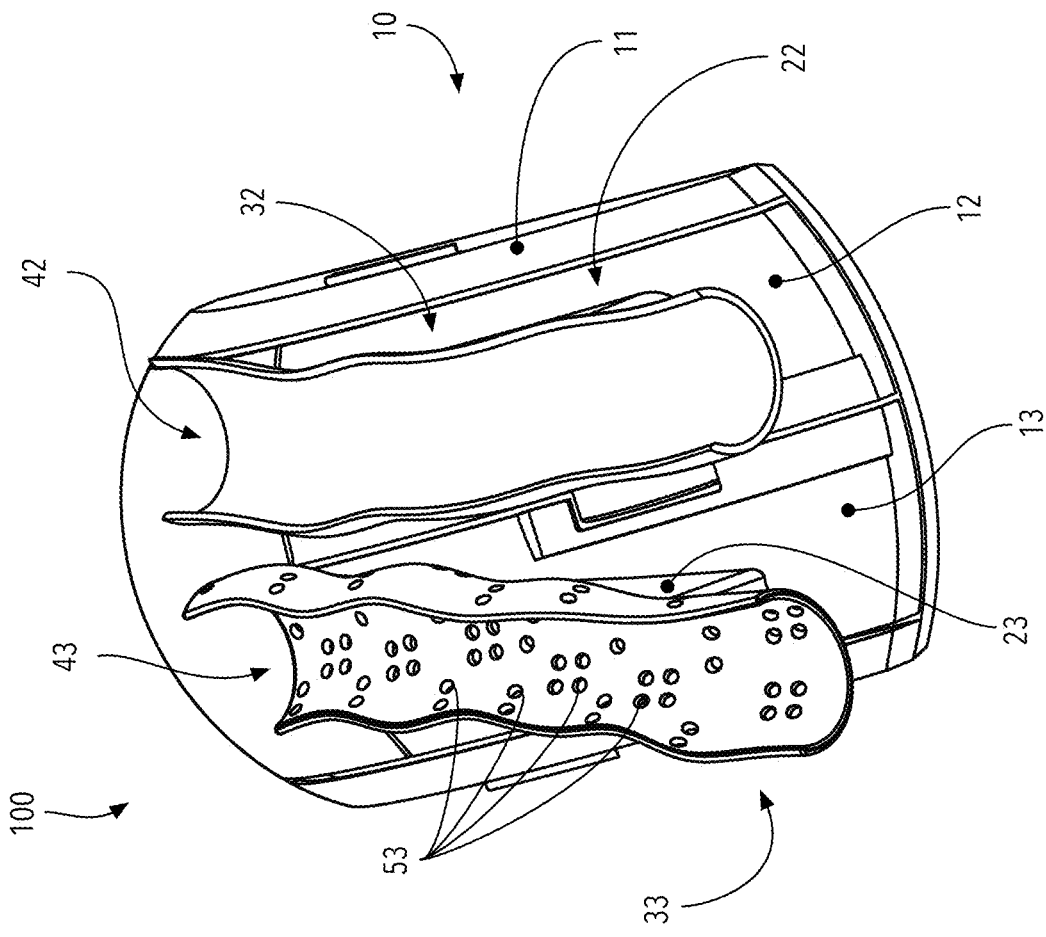
FIG. 2 illustrates a front-perspective view of the invention shown in FIG. 1.
Figure 3:
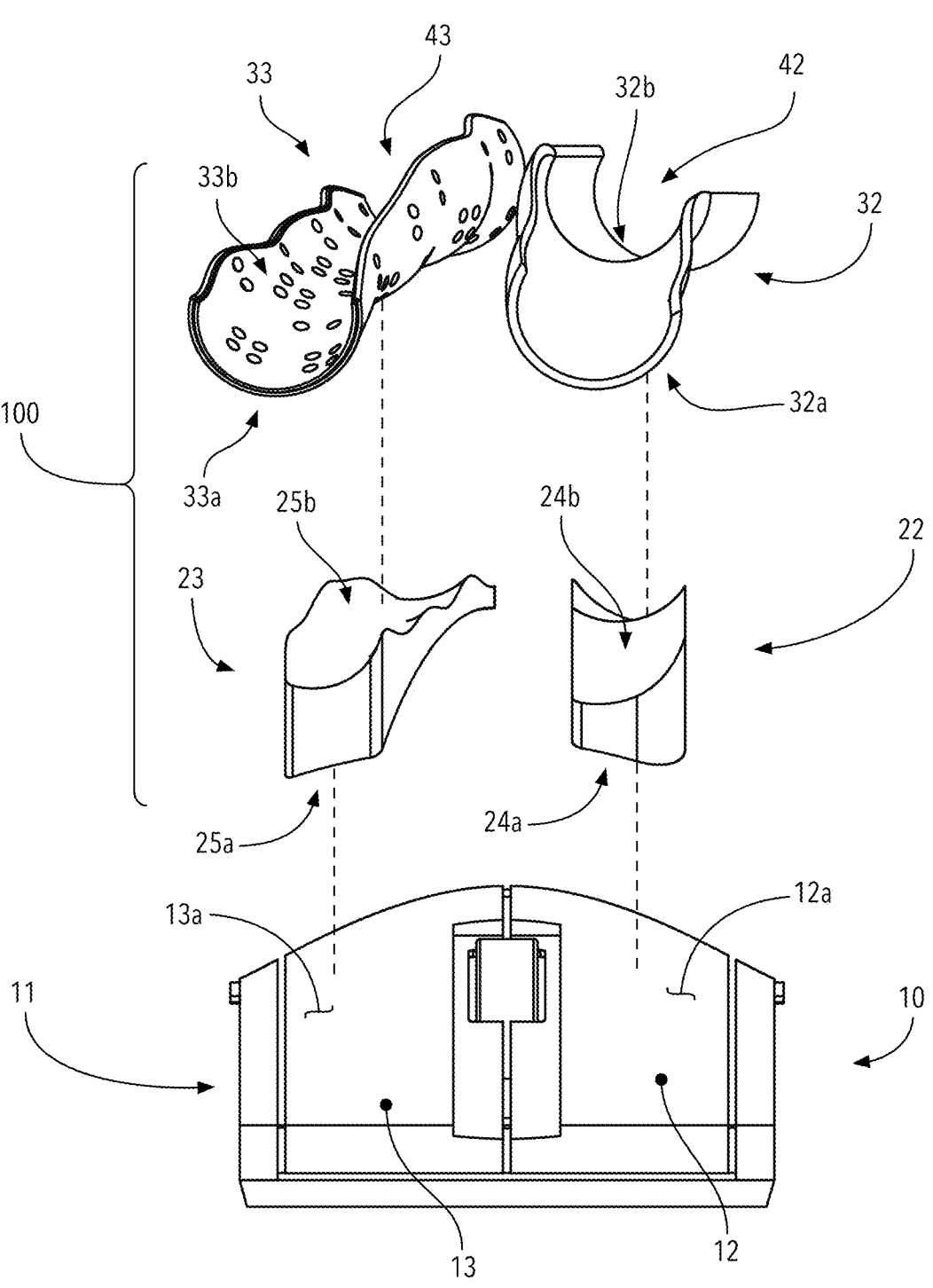
FIG. 3 illustrates a front exploded view of the invention shown in FIG. 1.
Figure 4:
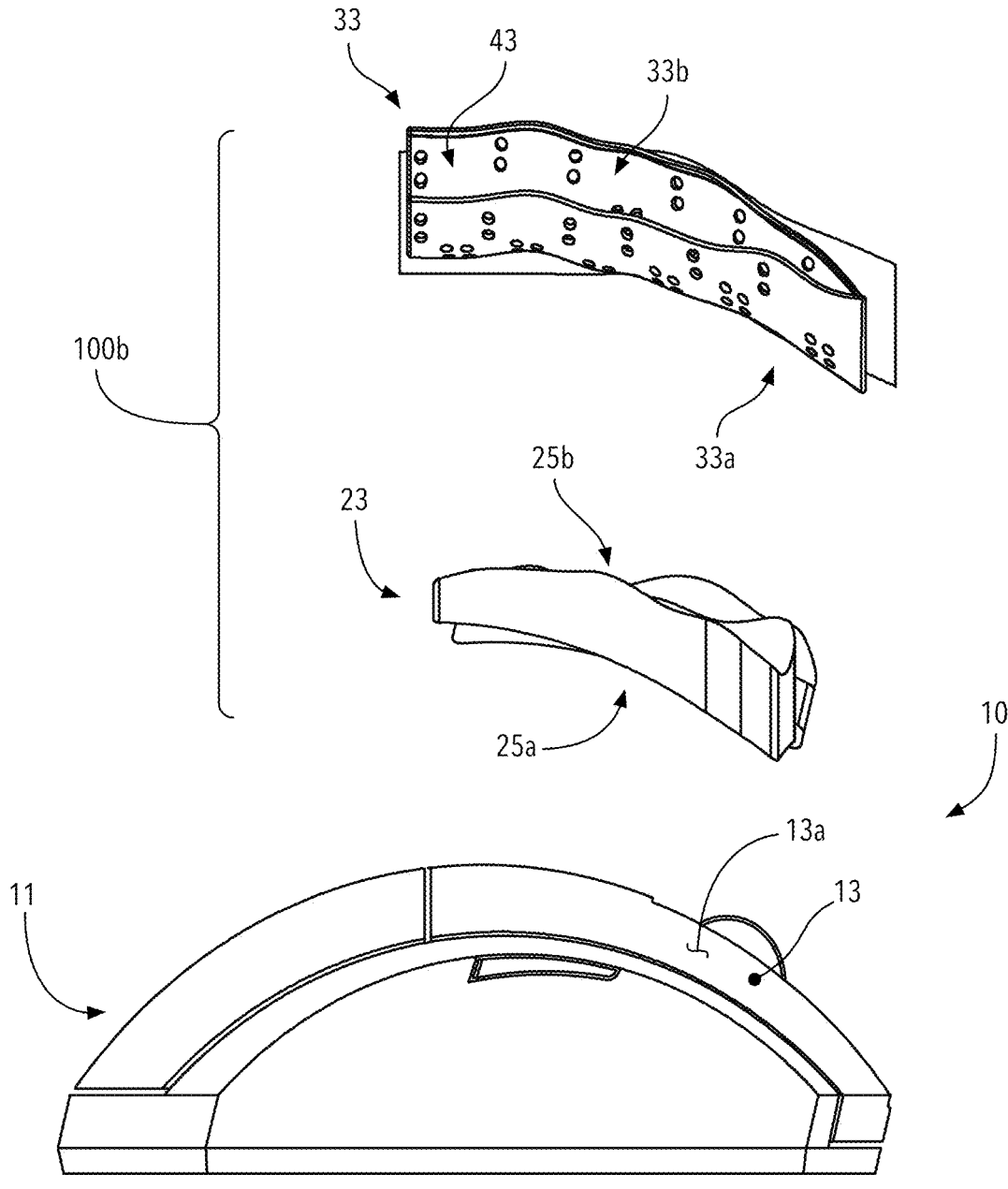
FIG. 4 illustrates a left-side exploded view of FIG. 3.
Figure 5:
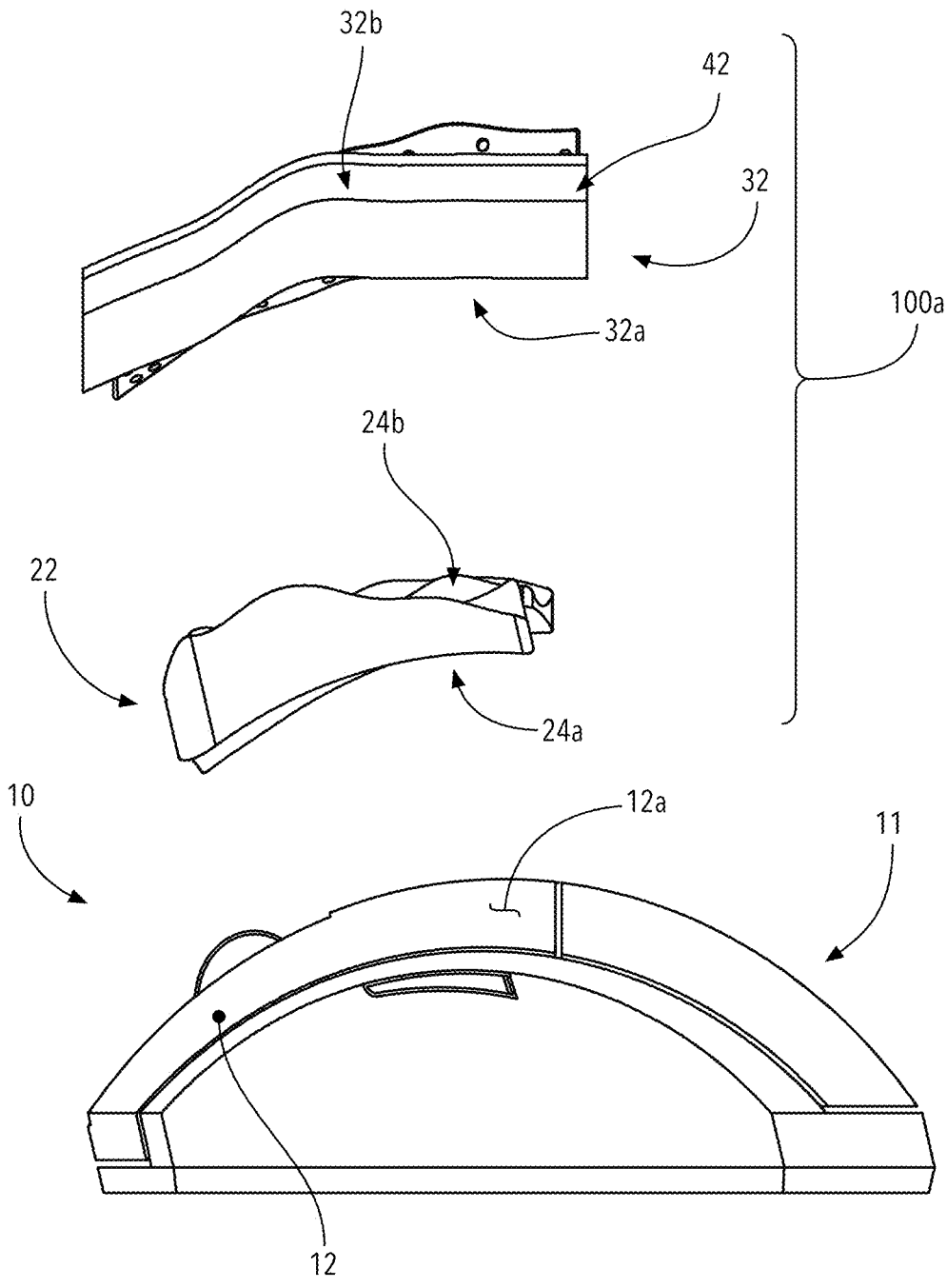
FIG. 5 illustrates a right-side exploded view of FIG. 3.
Figure 6:
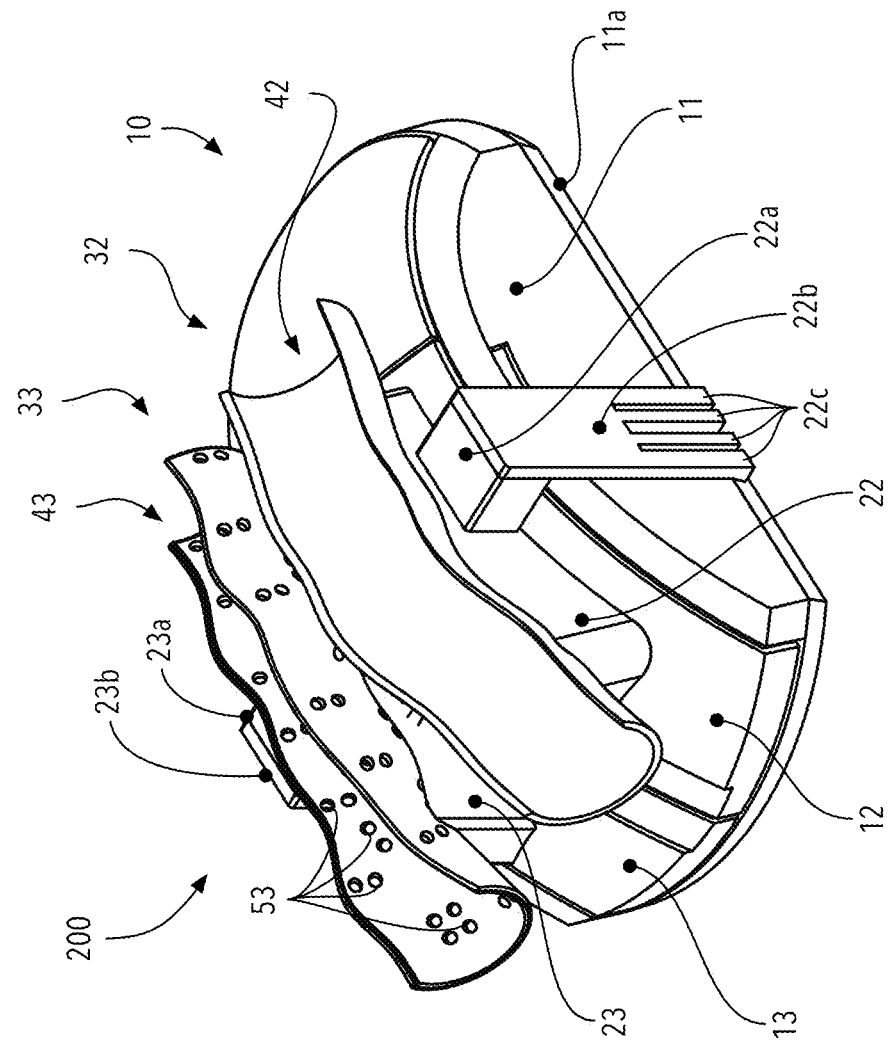
FIG. 6 illustrates a perspective view of a second embodiment of the present invention.
Figure 7:
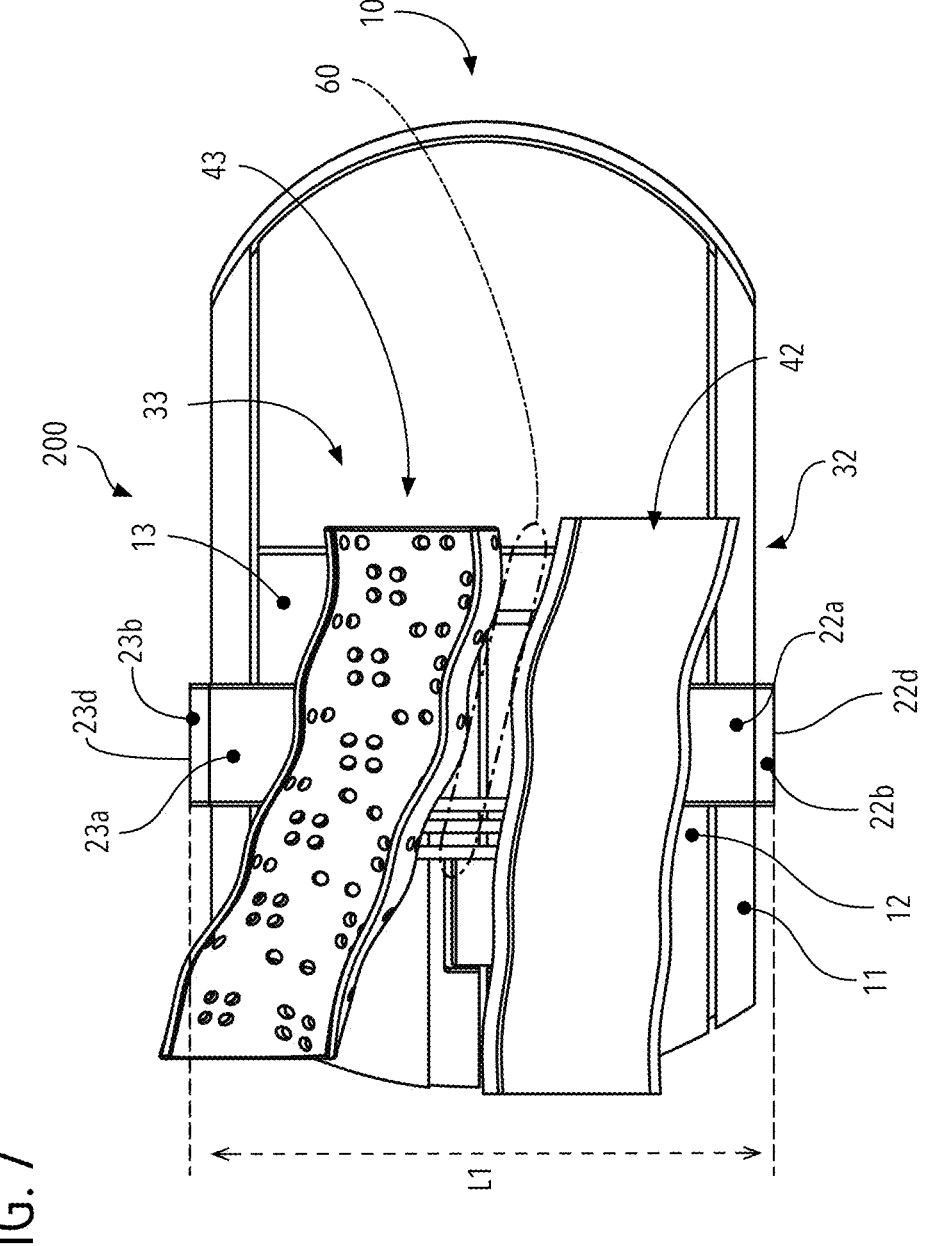
FIG. 7 illustrates a top view of the invention shown in FIG. 6.

FIG. 1 of the '747 application generally illustrates the anatomy of a human hand having thumb F1, index finger F2, middle finger F3, ring finger F4, and pinky finger F5. It should be noted that the phrases "first finger" and "second finger" are intended to mean any fingers 2 through 5 that are adjacent. FIG. 2 of the '747 application is an enlarged portion of the hand shown in FIG. 1 and generally illustrates a joint of a finger of the hand. FIG. 3 of the '747 application generally illustrates a plurality of joints of the hand. FIG. 4 is a flow chart that shows a traditional disease progression of rheumatoid arthritis having stages 01 through 05. FIG. 5 of the '747 application generally illustrates a visual side-by-side comparison of a non-RA human hand (shown on the left) and an RA-presenting human hand (shown on the right), whereas the RA-presenting human hand may be one of stages 03, 04, and/or 05, shown in FIG. 4. FIG. 6 of the '747 application generally illustrates the anatomy of an RA hand, a right hand (shown on the far left) is shown presenting with boutonniere deformity 1 (i.e., PIP hyperextension) and swan neck deformity 2 (i.e., DIP flexion), and a left hand (shown proximate the center) is shown presenting with ulnar drift 3 (i.e., deviation at the MCP joint). Boutonniere deformity 1 describes a medical condition in which the finger is flexed at the proximal interphalangeal joint (PIP) and hyperextended at the distal interphalangeal joint (DIP). This is usually a result of trauma in the acute setting and is caused by a rupture of the PIP central slip. Swan neck deformity 2 is generally characterized by proximal interphalangeal (PIP) joint hyperextension and flexion of the distal interphalangeal (DIP) joint. There is also reciprocal flexion noted of the metacarpophalangeal (MCP) joint. This is a result of an imbalance of the extensor mechanism of the digit. Ulnar deviation, or ulnar drift 3, is when the joints in the wrist and hand shift so that the fingers bend toward the ulna bone on the outside of the forearm. FIG. 7 of the '747 application generally shows the left and right RA hands illustrated in FIG. 6 of the '747 application and a representative embodiment of computer mouse 10 having body 11 with button 12 and button 13. As shown in the drawing, the first and second finger of the left RA hand do not align with buttons 12 and 13 of mouse 10 due to the significant deformations. FIG. 7 illustrates the aforementioned need for the present invention, i.e., an apparatus that allows hands having significant deformities to more readily, comfortably, and efficiently, use mouse 10. It should be noted that although FIG. 7 of the '747 application depicts computer mouse 10 in the left hand of the patient, traditionally, computer mouse 10 is used with the right hand, i.e., the first finger of the right hand engages button 12 and the second finger of the right hand engages button 13. Therefore, one having skill in the art would appreciate that the aforementioned depiction is an exemplary diagram to illustrate the difficulties associated with using a traditional computer mouse when RA deformities of the hand, specifically the fingers, are presenting.

Adverting now to the Figures and the present invention, the following description should be taken in view of FIGS. 1 through 5, which collectively illustrate a first embodiment of the present invention. Specifically, FIGS. 1 through 5 illustrate a side-perspective view, a front-perspective view, a front exploded view, a right-side exploded view, and a left-side exploded view of accessory 100, respectively. As described supra, computer mouse 10 generally includes body 11 having buttons 12 and 13, arranged thereon.

Accessory 100 is a "fixed" apparatus, in that it is fixedly secured to body 11 of mouse 10. Accessory 100 generally includes index finger mounting piece 22, fixedly secured to button 12 and middle finger mounting piece 23, fixedly secured to button 13. Mounting pieces 22 and 23 may be affixed to the respective buttons via adhesives, or the like. Mounting pieces 22 and 23, although generally illustrated a singular body, may have more than a single component to accommodate the specific shape and/or configurations of troughs 32 and 33, fixedly arranged thereon, i.e., mounting pieces 22 and 23 may each comprise two, three, or more, pieces that secure to the respective buttons of mouse 10. In some embodiments, mounting pieces 22 and 23 may not extend vertically in the manner shown, but may be configured as a slimmer (i.e., less "tall") mounting accessory. Essentially, mounting pieces 22 and 23 are supports that allow troughs 32 and 33 to be affixed to buttons 12 and 13.

Troughs 32 and 33 are arranged to respectively accept an index (or a first finger) and middle finger (or a second finger) of a patient therein (finger rests 42 and 43), allowing any pressure exerted by those fingers to effectively actuate buttons 12 and 13 of mouse 10, by applying force to mounting pieces 22 and 23 arranged on buttons 12 and 13.

Figures 10A, 10B, 10C, 10D:
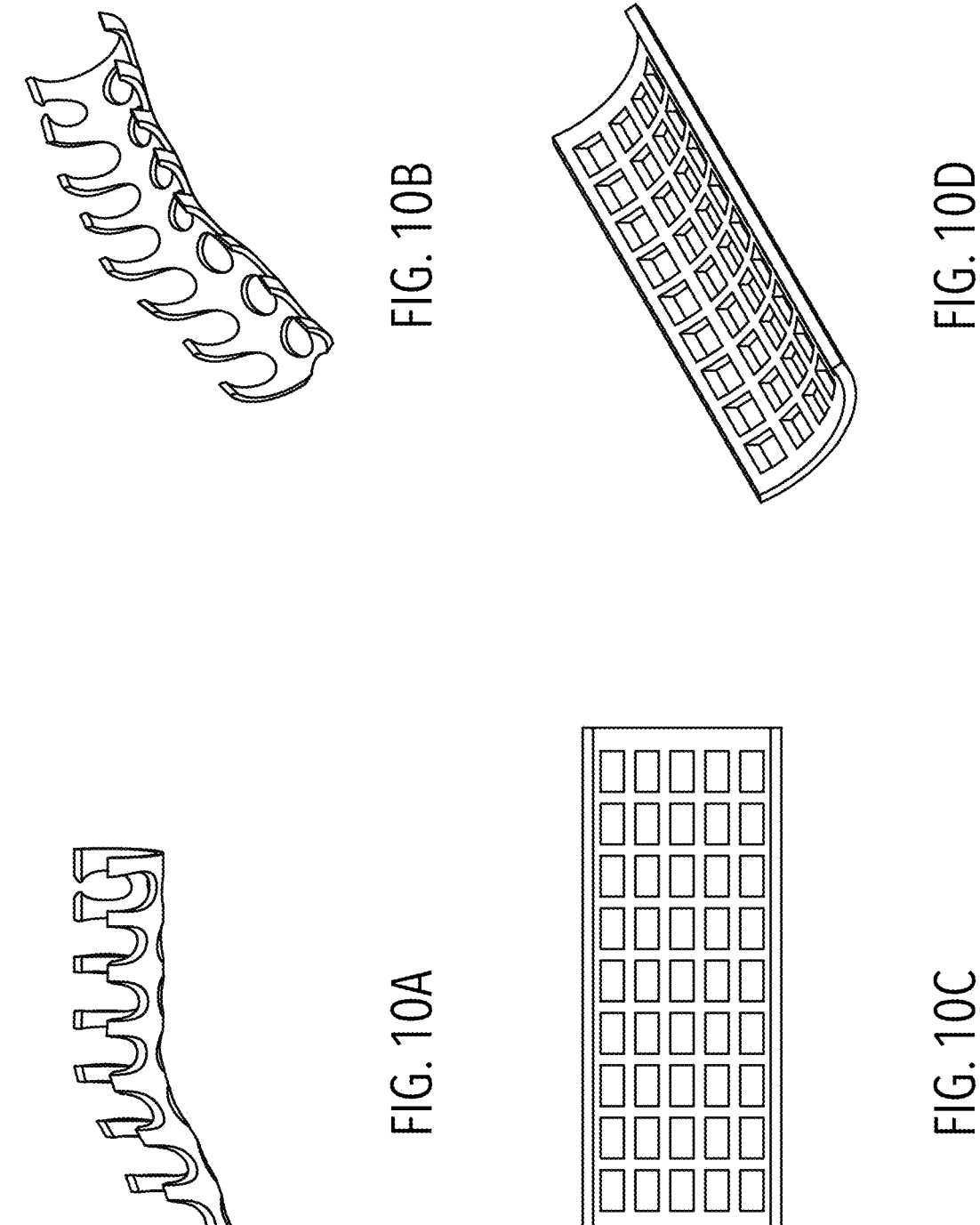
FIG. 10A is a perspective view of an alternative embodiment of the trough of the present invention shown in FIG. 1.
FIG. 10B is a top view of the trough shown in FIG. 10A.
FIG. 10C is a perspective view of a further alternative embodiment of the trough of the present invention shown in FIG. 8.
FIG. 10D is a right-side view of the trough shown in FIG. 10C.
Figure 11:
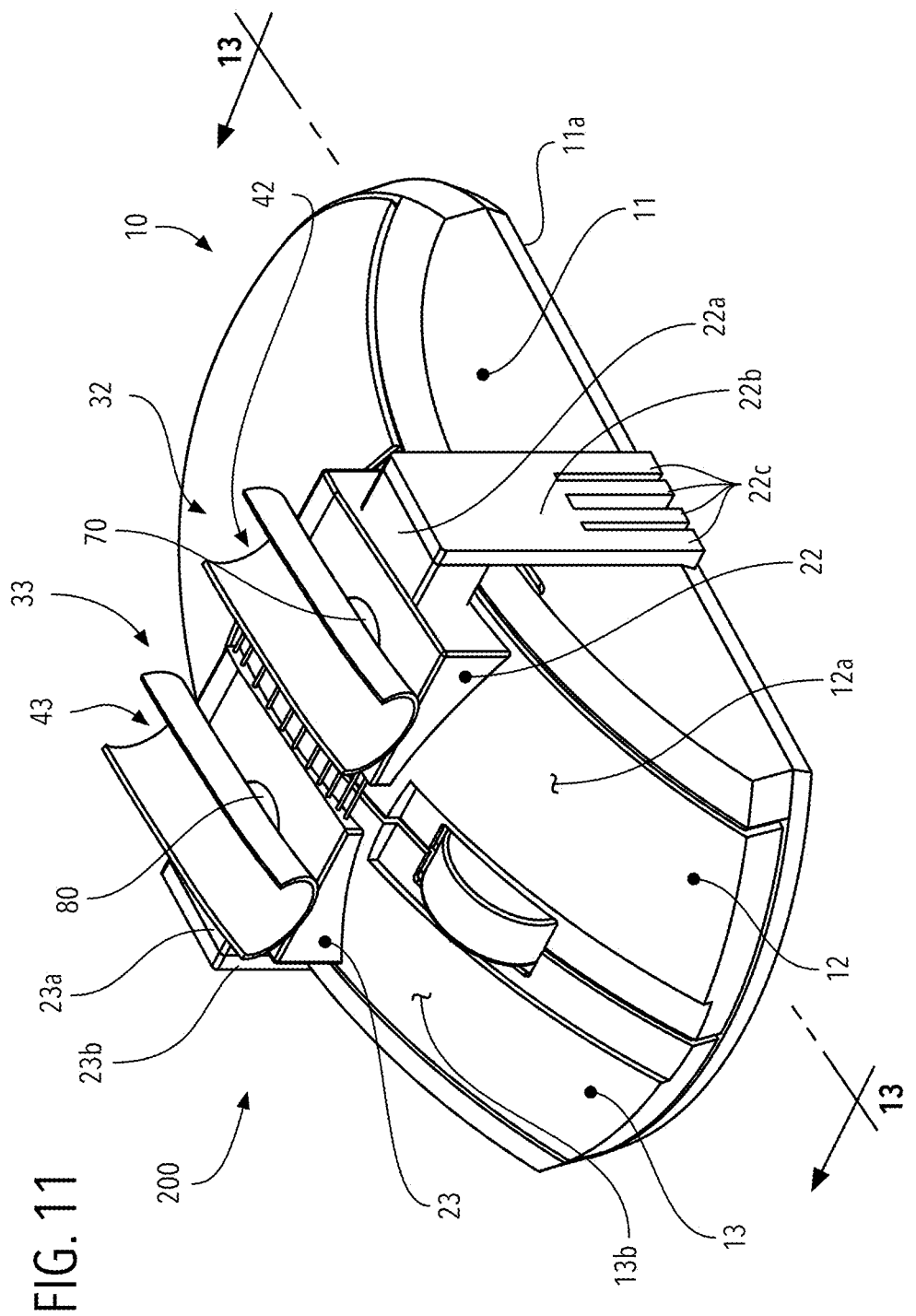
FIG. 11 is a perspective view of the invention shown in FIG. 6 with an alternative attachment piece for the trough of the present invention.

Troughs 32 and 33, or "finger support sections", are arranged to have a customized configuration, i.e., a specifically shaped finger rest (42 and/or 43) to accommodate deformations of a specific patient and their specific fingers. Finer shaped rests 42 and 43 are formed by the bending, molding, and/or forming, of troughs 32 and 33 to the respective curvatures, shapes, and/or contours, of the respective finger of a patient. Trough 33 is also illustrated to have plurality of apertures 53, which may be perforations, apertures, holes, etc., in trough 33 to afford breathability to a patient's finger resting therein. Trough 32 may also have apertures, or perforations, therein. In other embodiments, troughs 32 and 33 could take a mesh-like or web-like configuration, i.e., the apertures and/or spaces between the material are larger than those shown in trough 33. An example of this alternative arrangement of troughs 32 and 33, is illustrated in FIGS. 10A and 10B. It should be noted that the alternative arrangement of the trough illustrated in FIGS. 10A and 10B is in a pre-molded arrangement, that is, it has not been molded, shaped, and/or formed to fit the respective fingers of a patient.

In other embodiments, troughs 32 and 33 could be arranged to have less material and be configured to have a plurality of fingers extending from a lower bed, or surface, as generally shown in FIGS. 10C and 10D. Typically, rheumatoid arthritis affects joint linings, as discussed supra, causing painful swelling, which is painful to the touch. The embodiment of the trough shown in FIGS. 10C and 10D could be used for patients who may be experiencing pain from touch, as these arrangements necessarily have less material that would contact the respective finger, thereby allowing the patient to use a computer mouse for an extended period of time.

Accessory 100 essentially comprises first finger apparatus 100b, or "first finger member" (shown in FIG. 5) and second finger apparatus 100a, or "second finger member" (shown in FIG. 4). In some embodiments, accessory 100 may comprise at least one of: first finger apparatus 100b; second finger apparatus 100a; and, first finger apparatus 100b and second finger apparatus 100a.

Mounting pieces 22 and 23 are arranged to be molded, or arranged, to fit buttons 12 and 13 of mouse 10 and to accept troughs 32 and 33. Buttons 12 and 13 have contoured surfaces 12a and 13a, respectively, whereas distal end 24a of mounting piece 22 is arranged to have a substantially identical contour as contoured surface 12a of button 12 and distal end 25a of mounting piece 23 is arranged to have a substantially identical contour as contoured surface 13a of button 13. It can be said that button 12 has a first contour and button 13 has a second contour, whereas distal surface 24a has a third contour and distal surface 24a has a fourth contour. The first contour is substantially the same as the third contour and the second contour is substantially the same as the fourth contour. Since troughs 32 and 33 are customizably arranged, i.e., molded, fit, shaped, etc., to fit the specific shapes, i.e., deformities, of the first and second fingers, distal surfaces 32a and 33b of troughs 32 and 33 will have specific contours. As such, proximal surfaces 24b and 25b of mounting pieces 22 and 23 will have a substantially identical contour as distal surfaces 32a and 33b of troughs 32 and 33. It can be said that proximal surface 24b of mounting piece 22 has a fifth contour and proximal surface 25b of mounting piece 23 has a sixth contour, whereas distal surface 32a of trough 32 has a seventh contour and distal surface 33a of trough 33 has an eighth contour. The firth contour is substantially the same as the seventh contour and the sixth contour is substantially the same as the eighth contour.

In some embodiments, distal surfaces 24a and 25a may have an adhesive arranged thereon, or placed thereon, such that distal surfaces 24a and 25a of mounting pieces 22 and 23 may be flushly arranged (i.e., fixedly secured and flush to the respective buttons) on contoured surfaces 12a and 13a of buttons 12 and 13. In some arrangements, proximal surfaces 24b and 25b may have an adhesive arranged thereon, or placed thereon, such that distal surfaces 32a and 33a of troughs 32 and 33 may be flushly arranged (i.e., fixedly secured and flush to the respective buttons) on proximal surfaces 24b and 25b of mounting pieces 22 and 23. It should also be noted that in some arrangements, the mounting piece may be integral with the respective trough, i.e., a singular piece.

It should be noted that mounting pieces 22 and 23, and throughs 32 and 33 may be comprised of a thermoplastic, or thermosoft plastic, which may be any plastic polymer material that becomes pliable or moldable at a certain elevated temperature and solidifies upon cooling. In addition to the aforementioned materials, it should be noted that those in the art will appreciate that any suitable material, now known or hereafter developed, may be used in forming the aforementioned components of the present invention. As such, the troughs of the present invention are heated, then cooled (either forcibly or by exposure to ambient air), then molded around the respective fingers. Once molded, any excess material is then removed and the edges are buffed. Lastly, the fit of the respective trough is checked with the respective finger of the patient. Once cooled, or cured to the desirable arrangement, the respective proximal surfaces of the mounting pieces are heated and then molded to the respective curvature of the distal surfaces of the troughs—ensuring a flush fit thereon, while the respective distal surfaces of the mounting pieces, while heated, are placed onto the respective mouse buttons, thereby molding the distal surfaces of the mounting pieces to the respective contoured surfaces of the buttons. Adhesive is then applied to the proximal surfaces of the troughs to secure the troughs to the mounting pieces and additional adhesive is applied to the distal surfaces of the mounting pieces to secure the mounting pieces to the respective buttons. It should be appreciated that various alternative methods of affixing the mounting pieces, or members, to the buttons of the mouse is intended within the scope of the claims. The same can be said for the method of affixing the trough to the respective mounting piece, or member.

The following description should be taken in view of the aforementioned figures, respective description, and FIGS. 6 through 9 which generally illustrate a second embodiment of the present invention, accessory 200. Accessory 200 is a removable embodiment of accessory 100. It should be noted that the aforementioned descriptions of accessory 100 may also apply to accessory 200.

In FIGS. 6 through 9, computer mouse 10 has accessory 200 removably attached thereto. Accessory 200 is essentially a removably-attached version of accessory 100, described supra. Spring housings 22a and 23a extend from mounting pieces 22 and 23, respectively. Spring housings 22a and 23a springingly hold clamp bodies 22b and 23b in a position proximate to their respective mounting pieces. Gripping means 22c and 23c, extend from clamp bodies 22b and 23b and are arranged to engage and frictionally hold distal surface 11a of body 11 of mouse 10. Mounting pieces 22 and 23 are connected by members 60 and are not fixed to buttons 12 and 13, but rather held on and resting thereon by gripping means 22c and 23c of clamp bodies 22b and 23b. Members 60 are essentially tube-like pieces that are fixedly secured to mounting members 22 and 23, and may be configured as rectangular, circular, in multiples, or a single member, etc. Gripping means 22c and 23c may be rigid members, that are finger-like. Gripping means 22c and 23c may have rubberized material, or other high-coefficient friction material, to enhance contact and grip with mouse 10. In some embodiments, members 60 may have a semi-flexible construction affording vertical movement, but not horizontal movement. In other embodiments, members 60 may be rigid.

Clamp bodies 22b and 23b each have external edges 22d and 23d respectively, whereas edges 22d and 23d define length L1. Length L1 is a closed configuration of accessory 200, i.e., tension is pulling clamp bodies 22b and 23b (and therefore gripping means 22c and 23c forcibly into body 11 of mouse 10).

Figures 8, 9:
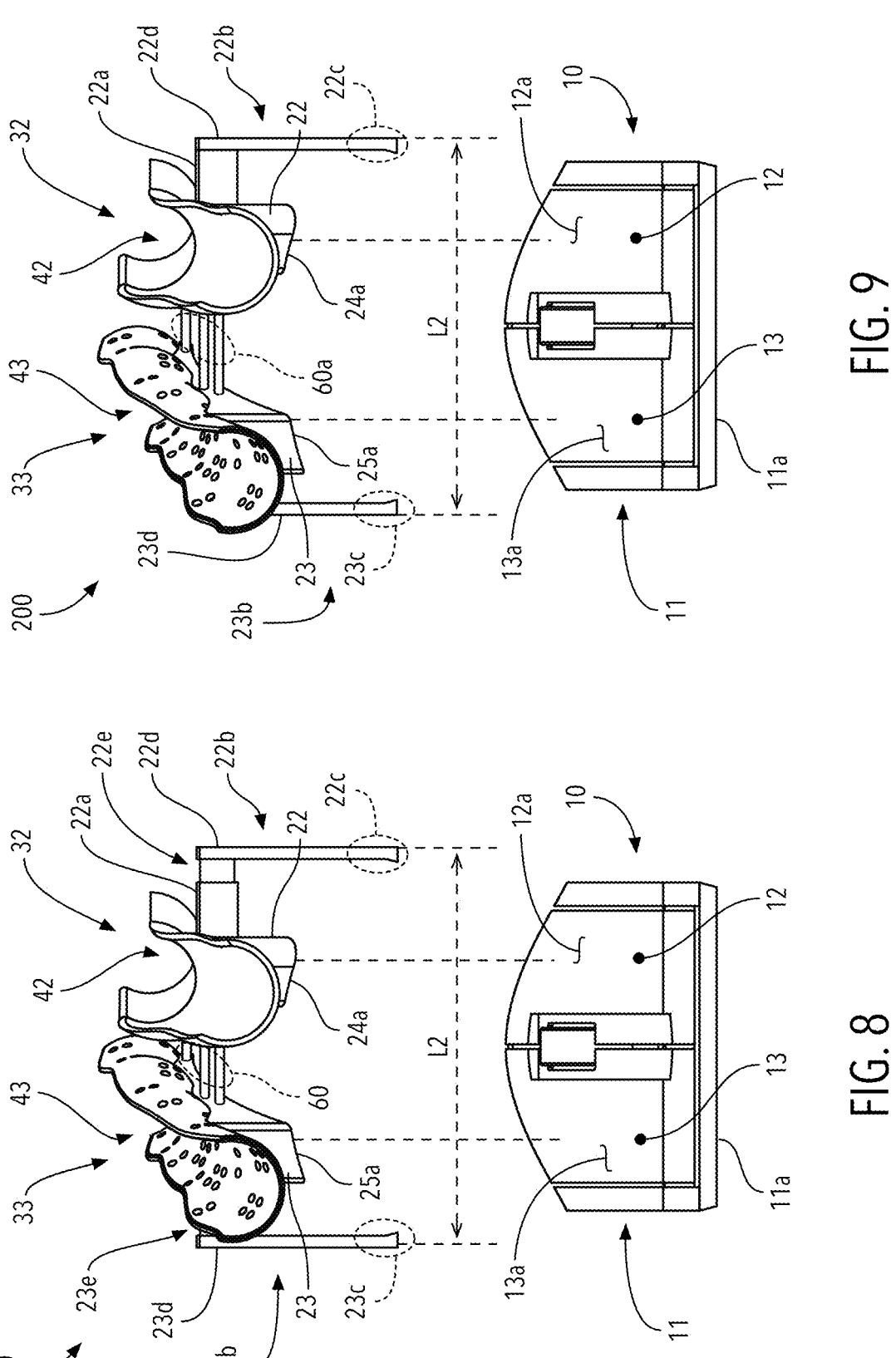
FIG. 8 is an exploded view of a first arrangement of the invention shown in FIG. 6.
FIG. 9 is an exploded view of a second arrangement of the invention shown in FIG. 6.

Accessory 200 may take two different forms. The first, as illustrated in FIG. 8, includes spring housings 22a and 23a extending from mounting pieces 22 and 23, which are arranged to accept inner portions 22e and 23e of clamp bodies 22b and 23b therein. Inner portions 22e and 23e extend from clamp bodies 22b and 23b, and are attached via a return mechanism, e.g., a spring, or the like, to pull inner portions 22e and 23e (and the respective clamp bodies) in a direction towards mounting pieces 22 and 23 (generally shown as length L1 in FIG. 14). To attach accessory 200 to mouse 10, clamp bodies 22b and 23b are pulled in directions D1 and D2 and forcibly held at length L2, such that accessory 200 can be engaged to mouse 10. Releasing the force on clamp bodies 22b and 23b thereby pulls inner portions 22e and 23e (and the respective clamp bodies) in a direction towards mounting pieces 22 and 23, which frictionally secures accessory 200 on mouse 10. Length L2 is greater than length L1.

The second of the two forms of accessory 200, generally shown in FIG. 9, is arranged such that clamp bodies 22b and 23b are fixedly secured to spring housings 22a and 23a, whereas the housings do not include return mechanisms. Members 60a are attached to one of mounting pieces 22 and 23, and have return mechanisms, e.g., springs, therein, such that accessory 200 may be forcibly expanded in directions D1 and/or D2 (expanded to length L2 as shown in FIG. 9) in order to be placed on, and removably engaged to, body 11 of mouse 10 (as shown in FIGS. 6 and 7, at length L1). Generally, length L2 is greater than length L1.

In some embodiments, members 60 may have a semi-flexible construction affording vertical movement, but not horizontal movement.

In reference to FIGS. 11 through 13B, an alternative embodiment of accessory 200 is shown which generally includes all of the components of accessory 200, as described supra. As shown in FIGS. 11 through 13B, accessory 200 includes a rotary adjustment mechanism which rotationally connects troughs 32 and 33 to mounting pieces 22 and 23 of accessory 200, specifically rotary connector 70 which connects trough 32 to mounting piece 22 and rotary connector 80 which connects trough 33 to mounting piece 23.

Figure 12:
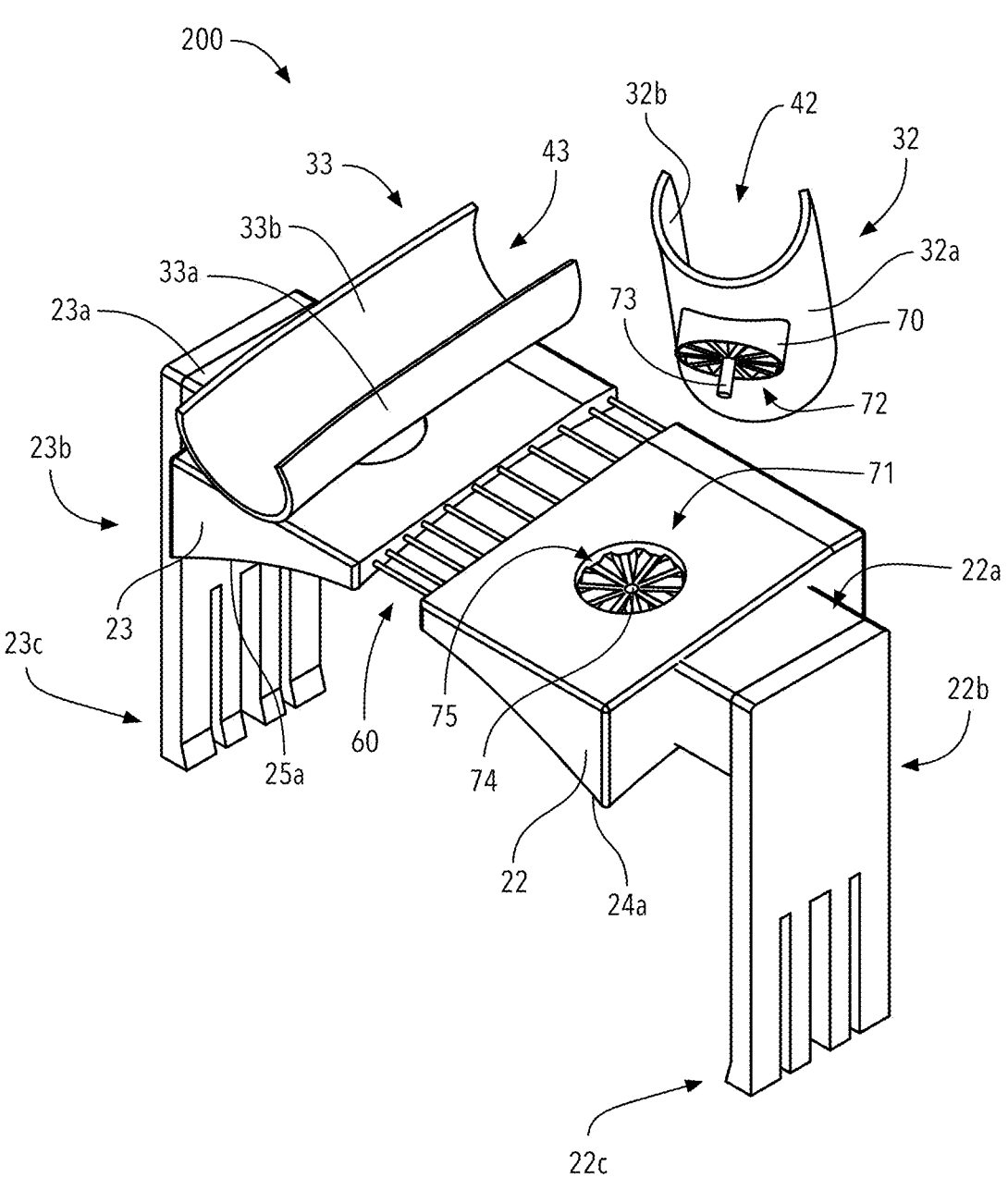
FIG. 12 is a partial exploded view of the alternative attachment piece shown in FIG. 11; and, FIGS. 13A and 13B are cross-sectional views taken generally along line 13-13 in FIG. 11.
Figure 13A:
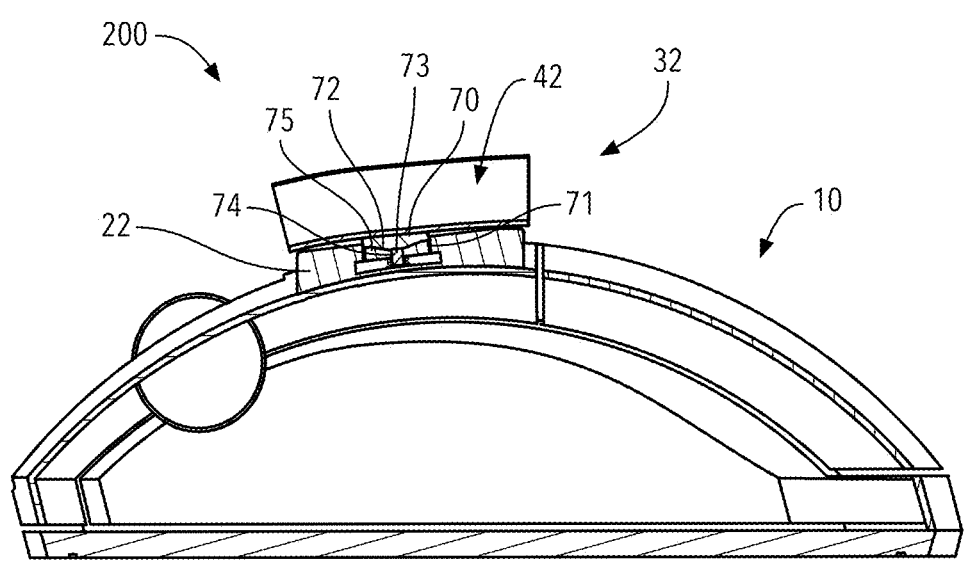
Figure 13B:
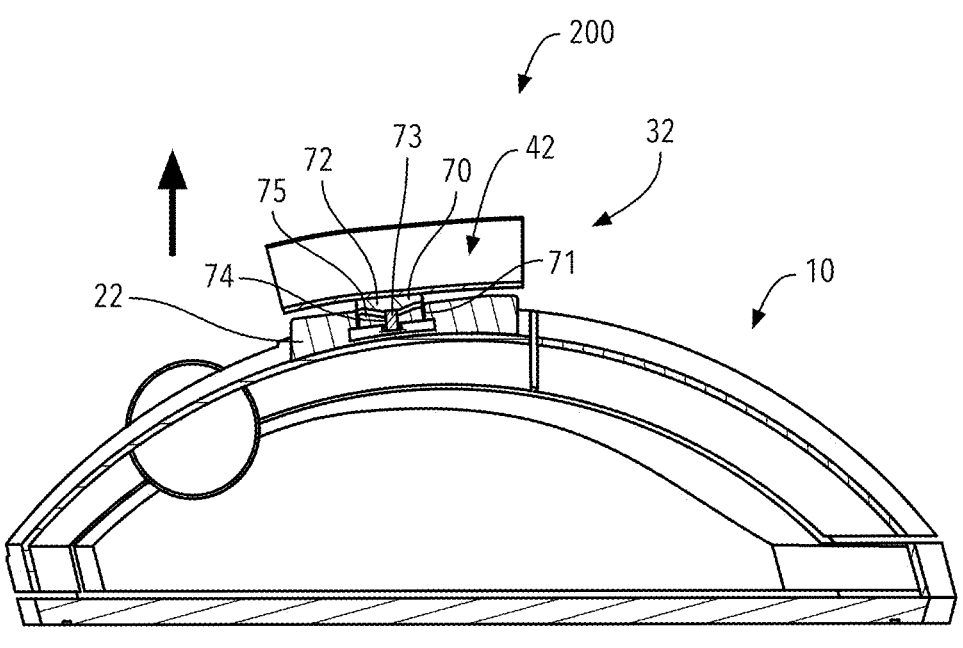

As shown in FIG. 12, the rotary adjustment mechanism may include rotary connector 70 which is affixed to distal surface 32a of trough 32. Rotary connector includes plurality of teeth 72 which extend in a direction towards mounting piece 22 and pin 73 extending in a direction towards mounting piece 22 and past plurality of teeth 72. Pin 73 is arranged to be at least partially seated within pin aperture 74 of rotary connector aperture 71. Rotary connector aperture 71 is arranged within, e.g., a partial through-bore, mounting piece 22 and has plurality of teeth 75 which generally circumscribe pin aperture 74. Pin 73 may include a stop, or other element arranged on its terminating end which maintains its position within pin aperture 74, but allows pin 73 to translate therein, preferably preventing complete removal thereof. When rotary connector 70 is pulled in a direction away from mounting piece 22 (e.g., upwards), plurality of teeth 72 of rotary connector 70 and plurality of teeth 75 of rotary connector aperture 71 are separated, thus allowing pin 73 to rotate within pin aperture 74, thereby allowing the angle of trough 32 to be adjusted (See FIG. 13B). In one possible embodiment, the terminating end of pin 73 may have a spring-like mechanism that biases rotary connector 70 (and thereby plurality of teeth 72) to contact plurality of teeth 75 of rotary connector aperture 71, i.e., the spring-like mechanism pulls rotary connector 70 downward, thereby locking trough 32 at a selected angle. When force is applied to rotary connector 70 in an upward direction (away from mounting piece 22), plurality of teeth 72 is disengaged from plurality of teeth 75, thereby allowing pin 73 to be rotated within pin aperture 74 to select a desired angle (See FIG. 13B), thus, when the aforementioned force is released, the spring-like mechanism will pull plurality of teeth 72 into plurality of teeth 75 substantially interlocking the sets of teeth to releasably lock the selected angle (See FIG. 13A).

It should be appreciated that the rotary adjustment mechanism comprises a rotary connector affixed to a trough which the rotary connector is arranged to be partially seated within a rotary connector aperture arranged within a respective mounting piece, where the rotary connector includes a plurality of teeth and a pin extending therefrom, and where the rotary connector aperture has a pin aperture arranged to rotatably accept the pin of the rotary connector therein and a plurality of teeth, which plurality of teeth are arranged to engage, mesh, interlock with the plurality of teeth of the rotary connector, thereby preventing rotation of the pin of the rotary connector to rotate within the pin aperture of the rotary connector aperture. As such, one or more of the mounting pieces and troughs of accessory 100 (See FIG. 1) could also include the rotary adjustment mechanism arranged between the trough and mounting piece.

The following description should be taken in view of all of the figures and the aforementioned description. In some embodiments, the present invention is an accessory (100) for a computer mouse (10), the computer mouse (10) having a body (11), a first button (13) and a second button (12), the accessory (100) comprising a first finger member (100b) having a first finger support section (23) and a first finger trough section (33) secured atop the first finger support section (23), the first finger trough section (33) having a shape (43) which is customized to fit a user's first finger, and a second finger member (100a) having a second finger support section (22) and a second finger trough section (32)

secured atop the second finger support section (22), the second finger trough section (32) having a shape (42) which is customized to fit a user's second finger, wherein the first finger support section (23) is operatively arranged to be secured to the first button (13), and wherein the second finger support section (22) is operatively arranged to be secured to the second button (12).

It will be appreciated by one having skill in the art that in alternative configurations the troughs of the present invention may be pre-fabricated, having a selected diameter, angle, slope, and/or curvature, instead of being custom-configured, as described, supra.

In view of the aforementioned disclosure of the present invention, it should be appreciated that described embodiments, specifically, "preferred embodiments", are not intended to be restrictive on the appending claims and should be interpreted as one of any possible embodiment described, or shown, in the present disclosure. Further, one having skill in the art of the present invention will also appreciate the embodiments that are not explicitly recited, or shown, are intended within the scope of the appending claims.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Computer mouse
11 Body
12 Right button
12a Contoured surface
13 Left button
13a Contoured surface
22 Mounting piece
22a Spring housing
22b Clamp body
22c Gripping means
22d External edge
22e Inner portion
23 Mounting piece
23a Spring housing
23b Clamp body
23c Gripping means
23d External edge
23e Inner portion
24a Distal surface
24b Proximal surface
25a Distal surface
25b Proximal surface
32 Trough
32a Distal surface
32b Proximal surface
33 Trough
33a Distal surface
33b Proximal surface
42 Finger shaped rest
43 Finger shaped rest
53 Plurality of apertures
60 Members
60a Spring members
70 Rotary connector 71 Rotary connector aperture
72 Plurality of teeth
73 Pin
74 Pin aperture
75 Plurality of teeth
80 Rotary connector
100 Accessory
200 Accessory
D1 Direction
D2 Direction

What is claimed is:

1. An accessory for a computer mouse, the computer mouse having a body, a first button and a second button, the accessory, comprising:
    a first mounting piece having a distal surface and a proximal surface, the distal surface arranged to be fixedly secured to the first button;
    a second mounting piece having a distal surface and a proximal surface, the distal of the second mounting piece arranged to be fixedly secured to the second button;
    a first trough having a distal surface and a proximal surface, the distal surface of the first trough arranged to be fixedly secured to the proximal surface of the first mounting piece, the first trough having a first patient-specific finger rest configuration; and,
    a second trough having a distal surface and a proximal surface, the distal surface of the second trough arranged to be fixedly secured to the proximal surface of the second mounting piece, the second trough having a second patient-specific finger rest configuration.

2. The accessory recited in claim 1, wherein the first button has a first contour and the second button has a second contour, wherein the distal surface of the first mounting piece has a third contour and the distal surface of the second mounting piece has a fourth contour, wherein the first contour and the third contour are substantially identical, wherein the second contour and the fourth contour are substantially identical.

3. The accessory recited in claim 2, wherein the proximal surface of the first mounting piece has a fifth contour, wherein the proximal surface of the second mounting piece has a sixth contour.

4. The accessory recited in claim 3, wherein the distal surface of the first trough has a seventh contour, wherein the distal surface of the second trough has an eighth contour.

5. The accessory recited in claim 4, wherein the fifth contour and the seventh contour are substantially identical, wherein the sixth contour and the eighth contour are substantially identical.

6. A process for making at least one of the first patient-specific finger rest configuration of the first trough and the second patient-specific finger rest configuration of the second trough recited in claim 1, the process comprising the steps of:
    cutting a first piece of thermoplastic;
    heating the first piece of thermoplastic;
    molding the heated first piece of thermoplastic on either a first finger or a second finger of a patient;
    letting the first piece of thermoplastic cool.

7. The process recited in claim 6 further comprising the step of trimming excess material from the first piece of thermoplastic.

8. The process recited in claim 7 further comprising the step of rolling edges of the first piece of thermoplastic.

9. The process recited in claim 8 further comprising the step of checking the fit of the first piece of thermoplastic with either the first or the second finger.

10. The accessory recited in claim 1 further comprising:
    a first rotary adjustment mechanism arranged between said first mounting piece and said first trough, thereby allowing said first trough to rotate; and,
    a second rotary adjustment mechanism between said second mounting piece and second trough, thereby allowing said second trough to rotate.

11. An accessory for a computer mouse, the computer mouse having a body, a first button, and a second button, the accessory, comprising:
    a first mounting piece and second mounting piece each of which having a proximal surface and a distal surface;
    a first trough having a distal surface and a proximal surface, the distal surface of the first trough arranged to be fixedly secured to the proximal surface of the first mounting piece, the first trough having a first patient-specific finger rest configuration; and,
    a second trough having a distal surface and a proximal surface, the distal surface of the second trough arranged to be fixedly secured to the proximal surface of the second mounting piece, the second trough having a second patient-specific finger rest configuration, wherein said first and second mounting pieces are:
    fixedly secured to said first and second buttons; or,
    removable secured to one or more of said body of said computer mouse, said first button, or said second button.

12. The accessory recited in claim 11 when said first and second mounting pieces are fixedly secured to said first and second buttons of said computer mouse, said first button has a first contour and said second button has a second contour.

13. The accessory for computer mouse recited in claim 12, wherein said distal surface of said first mounting piece said a third contour and said distal surface of said second mounting piece has a fourth contour.

14. The accessory for computer mouse recited in claim 13, wherein said first contour and said third contour are substantially identical and said second contour and said fourth contour are substantially identical.

15. The accessory recited in claim 11, when said first and second mounting pieces are fixedly secured to said first and second buttons of said computer mouse, further comprises:
    a first rotary adjustment mechanism arranged between said first mounting piece and said first trough, thereby allowing said first trough to rotate; and,
    a second rotary adjustment mechanism between said second mounting piece and second trough, thereby allowing said second trough to rotate.

16. The accessory recited in claim 11, when said first and second mounting pieces are removable secured to one or more of said body of said computer mouse, said first button, or said second button, further comprises:
    an attachment body arranged to frictionally secure to said body of said mouse, said attachment body including said first and second mounting pieces, wherein said first and second mounting pieces are connected by at least one connecting element.

17. The attachment body recited in claim 16 further comprising:
    a first gripping arm attached to said first mounting piece; and,
    a second gripping arm attached to said second mounting piece, wherein said first and second gripping arms frictionally secure to said body of said mouse.

18. The attachment body recited in claim 16 further comprising:

a first rotary adjustment mechanism arranged between said first mounting piece and said first trough, thereby allowing said first trough to rotate; and, a second rotary adjustment mechanism between said second mounting piece and second trough, thereby allowing said second trough to rotate.

\* \* \* \* \*